US006970083B2

(12) United States Patent  (10) Patent No.: US 6,970,083 B2
Venetianer et al.  (45) Date of Patent: Nov. 29, 2005

(54) VIDEO TRIPWIRE

(75) Inventors: Peter L. Venetianer, McLean, VA (US); Paul C. Brewer, Arlington, VA (US); Andrew J. Chosak, McLean, VA (US); John I. W. Clark, Leesburg, VA (US); Niels Haering, Arlington, VA (US); Alan J. Lipton, Herndon, VA (US); Gary Myers, Ashburn, VA (US); Chung-Cheng Yen, Clifton, VA (US); Pramod Kalapa, Vienna, VA (US)

(73) Assignee: Objectvideo, Inc., Reston, VA (US)

( * ) Notice: Subject to any disclaimer, the term of this patent is extended or adjusted under 35 U.S.C. 154(b) by 79 days.

(21) Appl. No.: 10/704,645

(22) Filed: Nov. 12, 2003

(65) Prior Publication Data

US 2004/0105570 A1   Jun. 3, 2004

Related U.S. Application Data

(63) Continuation-in-part of application No. 09/972,039, filed on Oct. 9, 2001, now Pat. No. 6,696,945.

(51) Int. Cl.⁷ .............................................. G08B 13/00
(52) U.S. Cl. ........................ 340/541; 348/152; 702/85
(58) Field of Search ........................ 340/541, 552–557; 348/143, 152–156; 715/700, 764

(56) References Cited

U.S. PATENT DOCUMENTS 3,812,287 A    5/1974  Lemelson
4,249,207 A    2/1981  Harman et al.
4,257,063 A    3/1981  Loughry et al.
5,491,511 A    2/1996  Odle
5,623,249 A    4/1997  Camire
5,696,503 A   12/1997  Nasburg
5,801,943 A    9/1998  Nasburg
5,926,210 A    7/1999  Hackett et al.
5,956,081 A    9/1999  Katz et al.
6,069,653 A    5/2000  Hudson
6,075,560 A    6/2000  Katz
6,091,771 A    7/2000  Seeley et al.
6,097,429 A    8/2000  Seeley et al.
6,177,886 B1   1/2001  Billington et al.
6,201,473 B1   3/2001  Schaffer
6,226,388 B1   5/2001  Qian et al.
6,297,844 B1  10/2001  Schatz et al.
6,696,945 B1 *  2/2004  Venetianer et al. ......... 340/541
2002/0008758 A1 *  1/2002  Broemmelsiek et al. .... 348/143
2002/0082769 A1   6/2002  Church et al.
2002/0171546 A1 * 11/2002  Evans et al. ................ 340/540
2004/0137915 A1 *  7/2004  Diener et al. ............ 455/456.1
2004/0151374 A1 *  8/2004  Lipton et al. ............... 382/181

OTHER PUBLICATIONS

Haering et al. "Visual Event Detection", Video Computing Series, M. Shah, Ed., pp. 1-146, (2001).

(Continued)

*Primary Examiner*—Thomas Mullen
(74) *Attorney, Agent, or Firm*—Venable LLP; Michael A. Sartori; Jeffrey W. Gluck

(57) ABSTRACT

A video tripwire system may enable a user to enter a video tripwire by drawing it on a video image or on a snapshot from a video stream. This drawing may be enabled by a graphical user interface.

29 Claims, 14 Drawing Sheets

OTHER PUBLICATIONS

Olson et al., "Moving Object Detection And Event Recognition Algorithms for Smart Cameras", IUW, pp. 159-175, (1997).

Allmen et al., "Long-Range Spatiotemporal Motion Understanding Using Spatiotemporal Flow Curves", Proc. IEEE CVPR, pp. 303-309, (1991).

Lipton et al., "Moving Target Classificatio nTracking From Real-Time Video", WACV, pp. 15-21, (1998).

Grimson et al., "Using Adaptive Tracking To Classify And Monitor Activities In A Site", CVPR, pp. 22-29, (1998).

Wren et al., "Pfinder: Real-Time Tracking Of The Human Body", IEEE Trans. on Pattern Matching and Machine Intelligence, vol. 19, pp. 780-784, (1997).

Collins et al., "A System For Video Surveillance And Monitoring", VSAM Final Report, Robotics Institute, Carnegie-Mellon University, Tech. Rept. No. CMU-RI-TR-00-12, pp. 1-68, (2000).

Gavrila, "The Visual Analysis Of Human Movement: A Survey", CVIU, Published in Computer Vision and Image Understanding, vol. 73, No. 1, pp. 1-43, (1999).

* cited by examiner

VIDEO TRIPWIRE

CROSS-REFERENCE TO RELATED APPLICATION

This application is a continuation-in-part of U.S. patent application Ser. No. 09/972,039, filed on Oct. 9, 2001, now issued as U.S. Pat. No. 6,696,945, entitled, "Video Tripwire," commonly-assigned, and incorporated herein by reference in its entirety.

FIELD OF THE INVENTION

This invention relates to surveillance systems. Specifically, the invention relates to video-based surveillance systems.

BACKGROUND OF THE INVENTION

In its original form, a tripwire was an arrangement in which a wire, string, or the like was stretched across a path, and if someone or something happened to trip over the wire or otherwise pull it, some response was triggered. For example, such a response could be detonating a landmine, sounding an alarm, or recording an event (e.g., triggering a counter, camera, etc.). Today, tripwires are often, for example, implemented as beams of light (e.g., laser, infrared, or visible); when someone or something breaks the beam, a response is triggered.

An example of a conventional tripwire using a light beam is shown schematically in FIG. 1. A source generates a beam of light, which is transmitted across a path to a receiver. If the beam is broken, then the receiver no longer receives it. This results in the triggering of some response, as discussed above.

Conventional tripwires are advantageous in that they are at least conceptually simple to use. They also require a minimum of human intervention, once they have been installed.

Conventional tripwires, however, have a number of disadvantages. For example, they can not discriminate between triggering objects of interest and those not of interest. As an example, one may be interested in how many people, but not dogs, walk down a path; however, either a person or a dog would trigger the tripwire. It is also problematic if a group of people walk together, resulting in a single triggering of the tripwire, rather than one for each person.

Furthermore, conventional tripwire arrangements generally involve the installation of dedicated equipment. For example, considering the example of a laser tripwire, a laser source and a laser detector must be installed across a path of interest. Additionally, such dedicated equipment may be difficult to install in such a manner that it is not easily detectable.

Additionally, a conventional tripwire does not afford a high degree of flexibility. Conventional tripwires typically detect if someone or something passes across it, only, without regard to direction of crossing. Furthermore, because they extend in straight lines, only, conventional tripwires are limited as to the regions across which they may be set up.

Conventional video surveillance systems are also in common use today. They are, for example, prevalent in stores, banks, and many other establishments. Video surveillance systems generally involve the use of one or more video cameras, and the video output from the camera or cameras is either recorded for later review or is monitored by a human observer, or both. Such a system is depicted in FIG. 2, where a video camera 1 is trained on the path. Video camera 1 generates video signals, which are transmitted over a communications medium, shown here as a cable 2. Cable 2 feeds one or both of a visual display device 3 and a recording device 4.

In contrast with conventional tripwires, video surveillance systems can differentiate between people and animals (i.e., between objects of interest and objects not of interest) and can differentiate the individuals within a group of people walking together. They further provide flexibility over tripwires, in terms of the shape of the regions they can monitor. Also, because video surveillance systems are so widely used, there is no need to install further equipment. However, video surveillance systems also suffer some drawbacks.

Perhaps the most significant drawback of conventional video surveillance systems is that they require a high degree of human intervention in order to extract information from the video generated. That is, either someone has to be watching the video as it is generated, or someone has to review stored video.

An example of a prior-art video-based surveillance system can be found in U.S. Pat. Nos. 6,097,429 and 6,091,771 to Seeley et al. (collectively referred to below as "Seeley et al."). Seeley et al. is directed to a video security system that includes taking snapshots when an intrusion is detected. Seeley et al. addresses some of the problems relating to false alarms and the need to detect some intrusions/intruders but not others. Image differencing techniques and object recognition techniques are used in this capacity. However, there are many differences between Seeley et al. and the present invention, as described below. Among the most severe shortcomings of Seeley et al. is a lack of disclosure as to how detection and recognition are performed. What is disclosed in these areas is in contrast to what is presented in regard to the present invention.

Another example of a video- and other-sensor-based surveillance system is discussed in U.S. Pat. Nos. 5,696,503 and 5,801,943 to Nasburg (collectively referred to below as "Nasburg"). Nasburg deals with the tracking of vehicles using multiple sensors, including video sensors. "Fingerprints" are developed for vehicles to be tracked and are used to subsequently detect the individual vehicles. While Nasburg does mention the concept of a video tripwire, there is no disclosure as to how such a video tripwire is implemented. Nasburg further differs from the present invention in that it is focused exclusively on detecting and tracking vehicles. In contrast, the present invention, as disclosed and claimed below, is aimed toward detecting arbitrary moving objects, both rigid (like a vehicle) and non-rigid (like a human).

SUMMARY OF THE INVENTION

In view of the above, it would be advantageous to have a surveillance system that combines the advantages of tripwires with those of video surveillance systems, and this is a goal of the present invention.

The present invention implements a video tripwire system, in which a virtual tripwire, of arbitrary shape, is placed in digital video using computer-based video processing techniques. The virtual tripwire is then monitored, again using computer-based video processing techniques. As a result of the monitoring, statistics maybe compiled, intrusions detected, events recorded, responses triggered, etc. For example, in one embodiment of the invention, the event of a person crossing a virtual tripwire in one direction may trigger the capture of a snapshot of that person, for future identification.

The inventive system may be implemented using existing video equipment in conjunction with computer equipment. It thus has the advantage of not requiring extensive installation of monitoring equipment. The inventive system may be embodied, in part, in the form of a computer-readable medium containing software implementing various steps of a corresponding method, or as a computer system, which may include a computer network, executing such software.

The inventive system may also be used in conjunction with imaging devices other than conventional video, including heat imaging systems or infrared cameras.

One embodiment of the invention comprises a method for implementing a video tripwire system, comprising steps of: installing a sensing device (which may be a video camera or other such device), if one does not already exist; calibrating the sensing device; establishing a boundary as a virtual tripwire; and gathering data.

Further objectives and advantages will become apparent from a consideration of the description, drawings, and examples.

DEFINITIONS

In describing the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include a magnetic hard. disk; a floppy disk; an optical disk, like a CD-ROM or a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include an internet, such as the Internet; an intranet; a local area network (LAN); a wide area network (WAN); and a combination of networks, such as an internet and an intranet.

"Video" refers to motion pictures represented in analog and/or digital form. Examples of video include television, movies, image sequences from a camera or other observer, and computer-generated image sequences. These can be obtained from, for example, a live feed, a storage device, an IEEE 1394-based interface, a video digitizer, a computer graphics engine, or a network connection.

"Video processing" refers to any manipulation of video, including, for example, compression and editing.

A "frame" refers to a particular image or other discrete unit within a video.

BRIEF DESCRIPTION OF THE DRAWINGS

The invention is better understood by reading the following detailed description with reference to the accompanying figures, in which like reference numerals refer to like elements throughout, and in which.

DETAILED DESCRIPTION OF THE PREFERRED EMBODIMENTS

Figure 1:
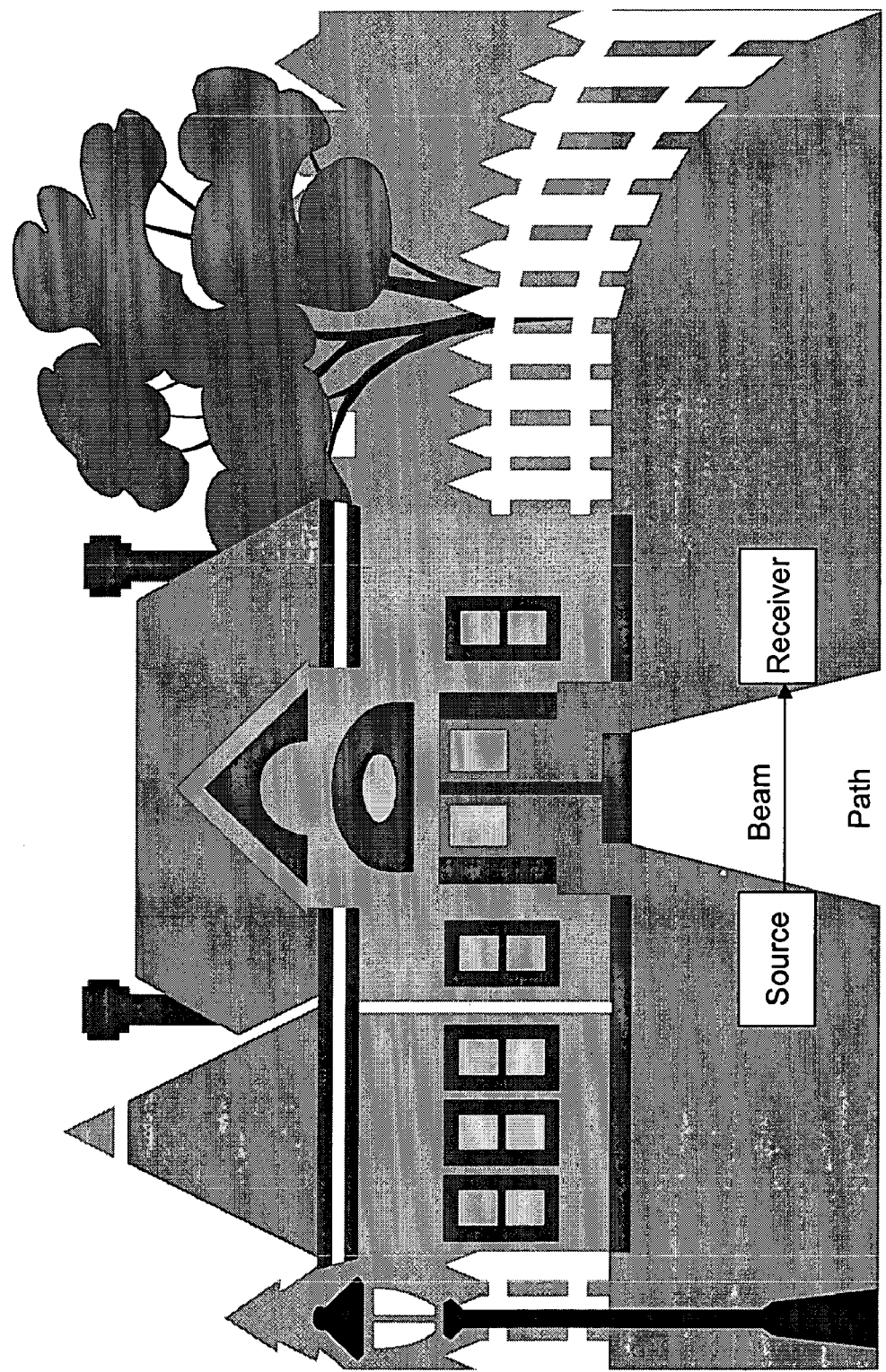
FIG. 1 shows a prior art tripwire system.

In describing preferred embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. Each reference cited here is incorporated by reference as if each were individually incorporated by reference.

Furthermore, the embodiments discussed below are generally discussed in terms of detection of people. However, the invention is not to be understood as being limited to the detection of people. On the contrary, the video tripwire system in the embodiments discussed below can be used to detect objects of all sorts, animate or inanimate. Examples include vehicles, animals, plant growth (e.g., a system that detects when it is time to trim hedges), falling objects (e.g., a system that detects when a recyclable can is dropped into a garbage chute), and microscopic entities (e.g., a system that detects when a microbe has permeated a cell wall).

Figure 2:
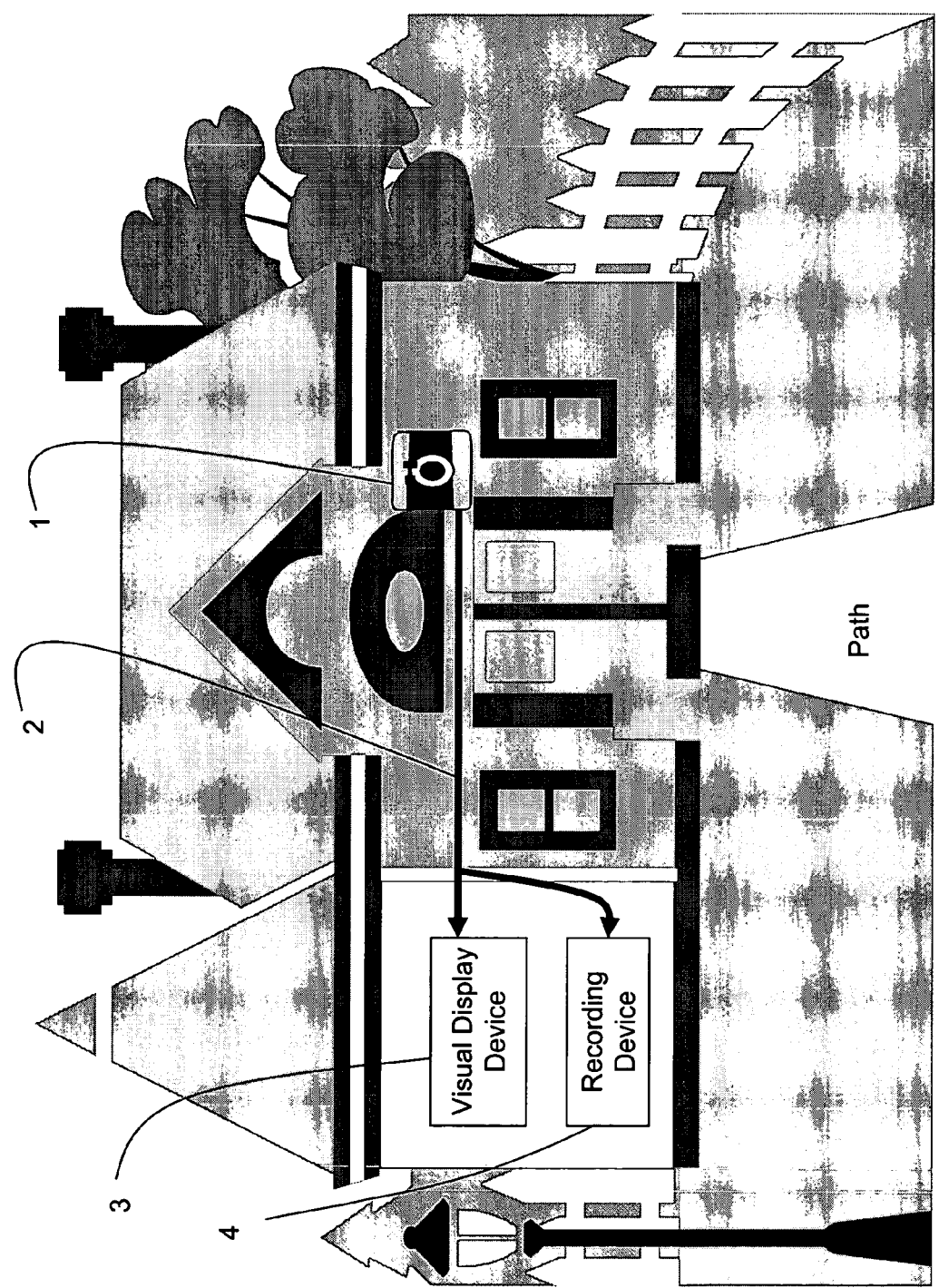
FIG. 2 shows a prior art video surveillance system.
Figure 3:
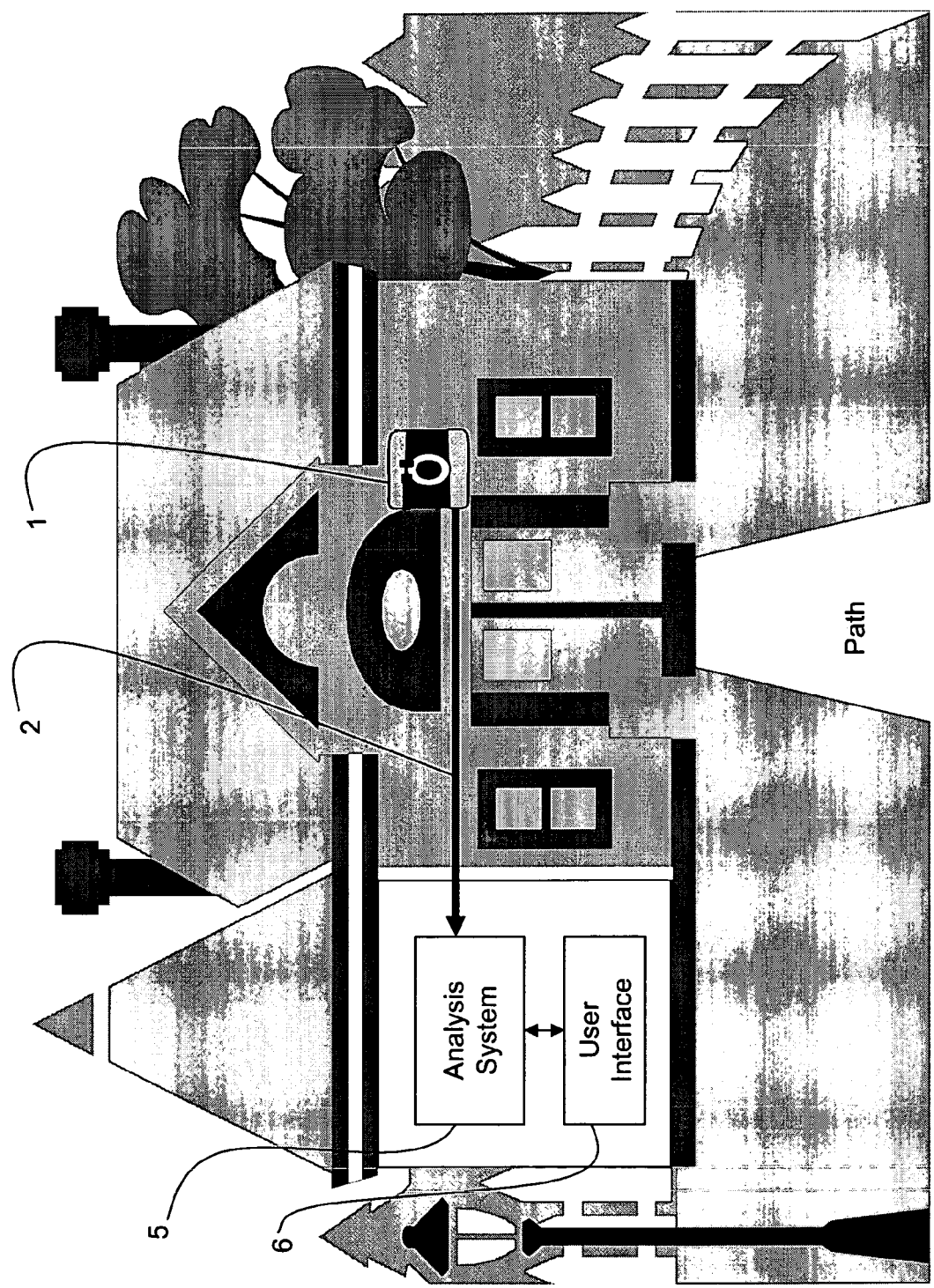
FIG. 3 shows a video tripwire system according to an embodiment of the invention.

FIG. 3 shows an overview of an embodiment of a video tripwire system. As in FIG. 2, sensing device 1 is trained on the path and generates output signals. Sensing device 1 may be a video camera, as discussed in connection with FIG. 2; however, it may also be any other type of sensing device that generates a video-type output, for example, a heat-based, sound-based (e.g., sonogram) or infrared-based device. The output of sensing device 1 is transmitted over communication medium 2. Communication medium 2 maybe a cable, for example; however, it may also be any other communication medium, for example, RF, a network (e.g., the Internet), or light-wave. If communication over communication medium 2 requires modulation, coding, compression, or other communication-related signal processing, means for performing such signal processing are provided either as part of sensing device 1 or as a separate means coupled to sensing device 1 (not shown). Communication medium 2 carries the output signals from sensing device 1 to analysis system 5. Analysis system 5 receives input from and sends output to a user interface 6. User interface 6 may include, for example, a monitor, a mouse, a keyboard, a touch screen, a printer, or other input/output devices. Using user interface 6, a user is able to provide inputs to the system, including those needed to initialize (including creating a virtual tripwire, as will be described below) and to provide commands to analysis system 5. User interface 6 may also include an alarm or other alerting device; it may further include or be connected to means for implementing any other response to a triggering event, for example, as discussed above. User interface 6 will also generally include a display device like monitoring device 3 in FIG. 2.

Figure 4:
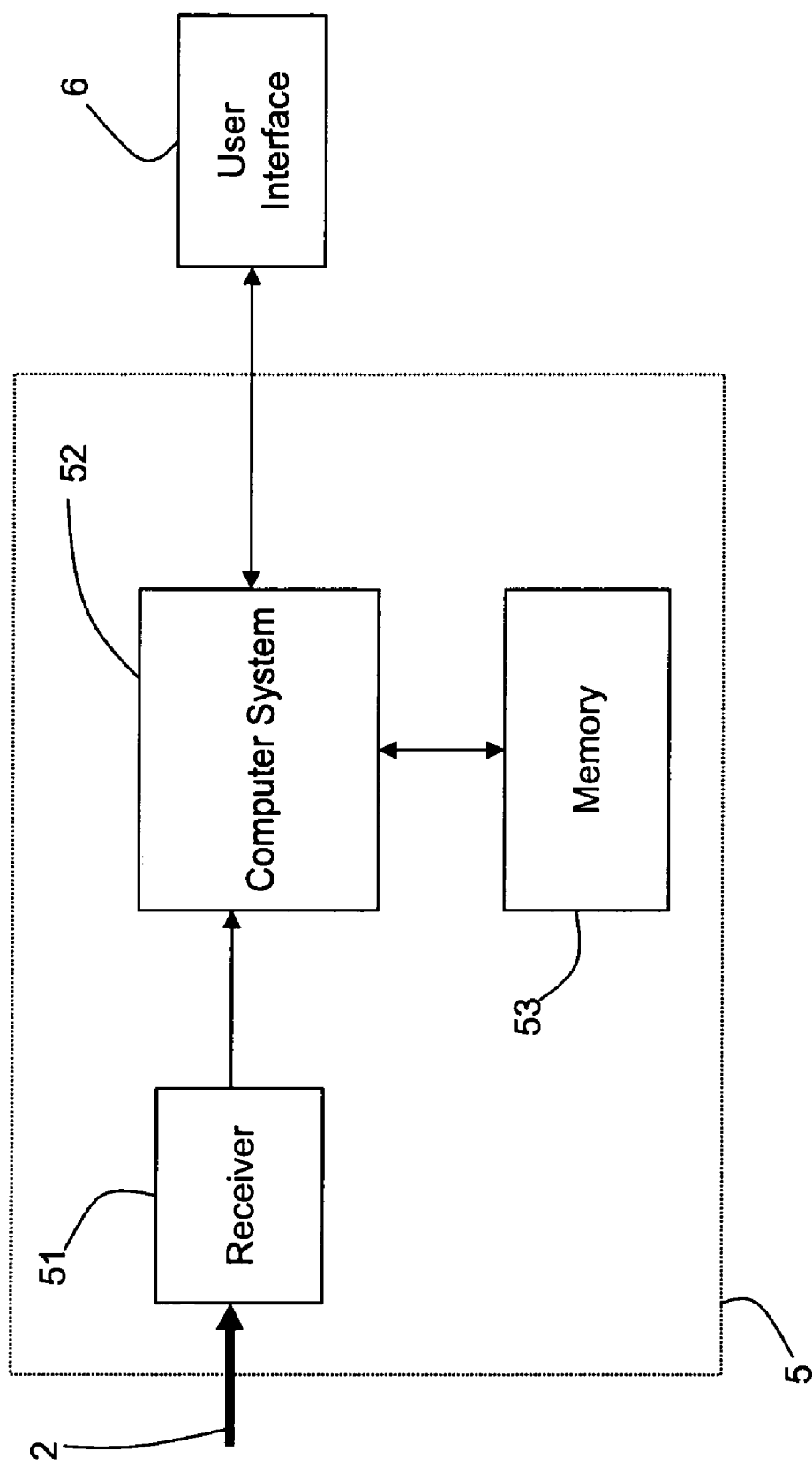
FIG. 4 shows a block diagram of an embodiment of an analysis system according to an embodiment of the invention.

Analysis system 5 performs analysis tasks, including necessary processing to implement the video tripwire. An embodiment of analysis system 5 is shown in more detail in FIG. 4. FIG. 4 shows analysis system 5 coupled to communication medium 2 and to user interface 6, as also shown in FIG. 3. In FIG. 4, analysis system 5 is shown comprising receiver 51, computer system 52, and memory 53. Receiver 51 receives the output signals of sensing device 1 from communication medium 2. If the signals have been modulated, encoded, etc., receiver 51 contains means for performing demodulation, decoding, etc. Furthermore, if the signals received from communication medium 2 are in analog form, receiver 51 includes means for converting the analog signals into digital signals suitable for processing by computer system 52. Receiver 51 may be implemented as a separate block, as shown, or it may be integrated into computer system 52, in an alternative embodiment. Also, if it is not necessary to perform any signal processing prior to sending the signals from communication medium 2 to computer system 52, receiver 51 may be omitted entirely.

Computer system 52 is provided with memory 53, which may be external to, as shown, or incorporated into computer system 52, or a combination of both. Memory 53 includes all memory resources required by analysis system 52 and may also include one or more recording devices for storing signals received from communication medium 2.

In a further embodiment of the invention, sensing device 1 maybe implemented in the form of more than one sensing device monitoring the same location. In this case, the data output by each sensing device may be integrated prior to transmitting data over communication medium 2, or the outputs of all sensing devices may be transmitted to analysis system 5 and dealt with there.

In yet a further embodiment of the invention, sensing device 1 may comprise a number of sensing devices monitoring different locations and sending their data to a single analysis system 5. In this way, a single system can be used for surveillance of multiple sites.

The processes performed by the components shown in FIGS. 3 and 4 will become clear in light of the following discussion of the inventive methods.

Figure 5:
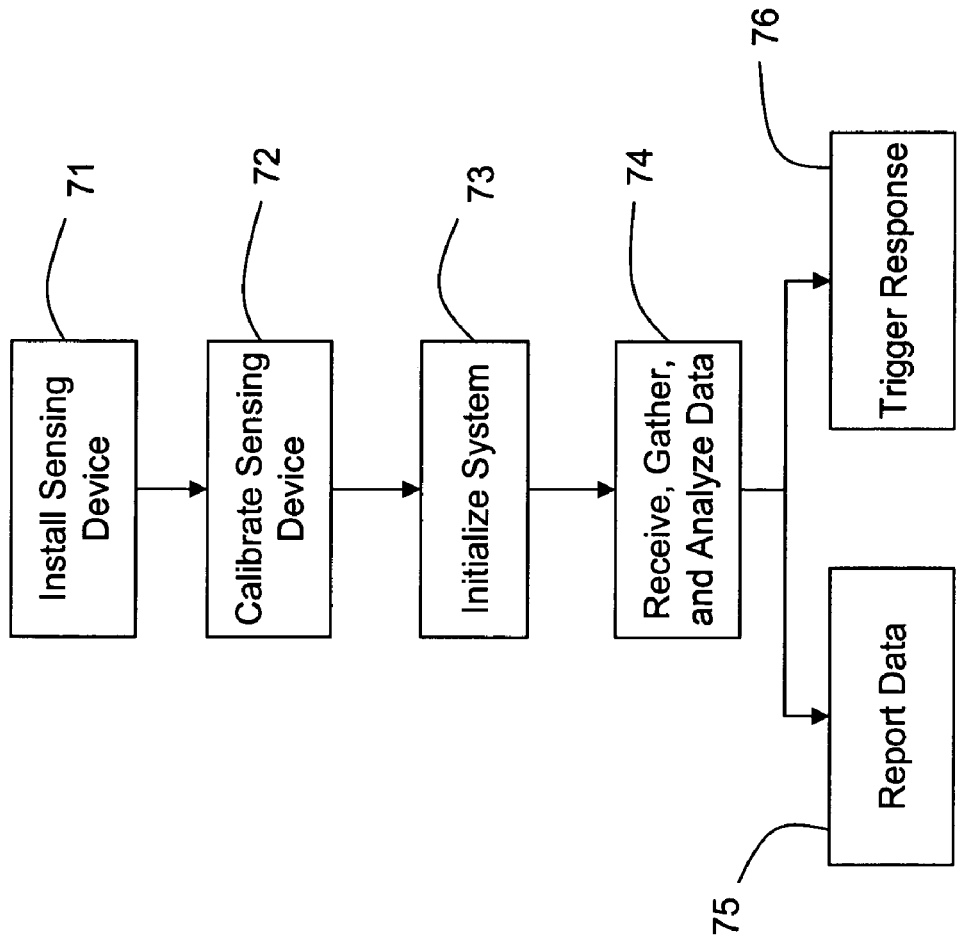
FIG. 5 shows a flowchart depicting a method according to an embodiment of the invention.

FIG. 5 shows an overview flowchart of an embodiment of the inventive method. If a sensing device 1 has not yet been installed, one must be installed 71. In many cases, however, such sensing devices may already exist. For example, most banks already use video surveillance systems, so there is no need to install new video cameras. In a preferred embodiment of the system, the sensing device (or devices) is installed so as to be stationary. Ideally, it is installed with "natural" orientation (i.e., up in the images corresponding to up in the real world).

Once sensing device 1 has been installed, it is necessary to calibrate it with analysis system 5. System calibration may be performed, generally speaking, by either explicit calibration, in which the system is told (or automatically determines) the necessary calibration parameters of sensing device 1, or by implicit calibration, in which the system is told (or automatically determines) the size of an object of interest at various locations in the field-of-view of sensing device 1. The purpose of calibration is to provide scale information, i.e., so that the system knows what the size of a person or other object of interest should be in different image areas. This information is especially important for the data analysis step 74. Calibration may be performed in one of, or in a combination of two or more of, three ways: manual numeric calibration, aided segmentation calibration, and fully automatic calibration. Flowcharts of embodiments of these methods are shown in FIGS. 6, 7, and 8, respectively.

Figure 6:
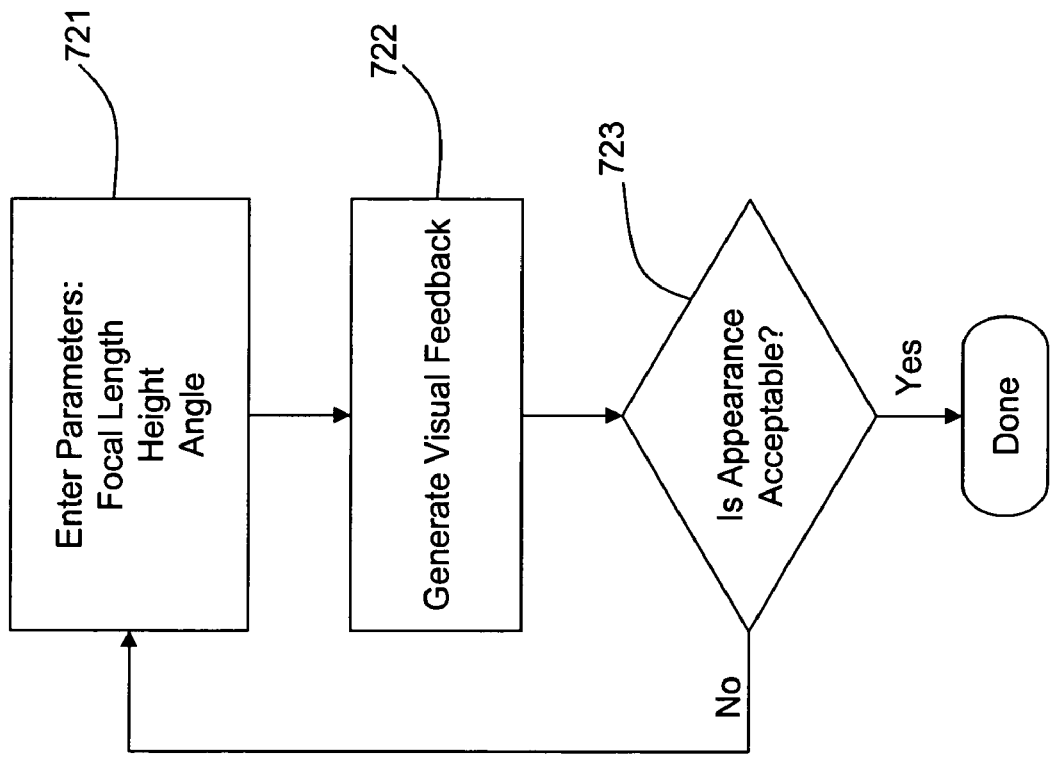
FIG. 6 shows a flowchart depicting a first embodiment of the calibration step shown in FIG. 5.

FIG. 6 shows a flowchart of an embodiment of the manual calibration method, which involves explicit calibration, as discussed above. A user enters parameters 721, via user interface 6, relating to sensing device 1. These parameters may include, for example, focal length of sensing device 1, the height of sensing device 1 from the ground, and the angle of sensing device 1, with respect to the ground. The analysis system 5 then generates visual feedback 722; for example, the system may superimpose a person or other object of interest on an actual video frame. The visual feedback is presented to the user at user interface 6. The visual feedback provides scale information (e.g., the size of the person or other object of interest relative to its surroundings), which helps to verify that the calibration is correct. The user then decides if the appearance of the visual feedback is acceptable or if the parameters need to be adjusted 723. If it is acceptable, the process is finished; otherwise, the process loops back for entry of new parameters 721.

Figure 7:
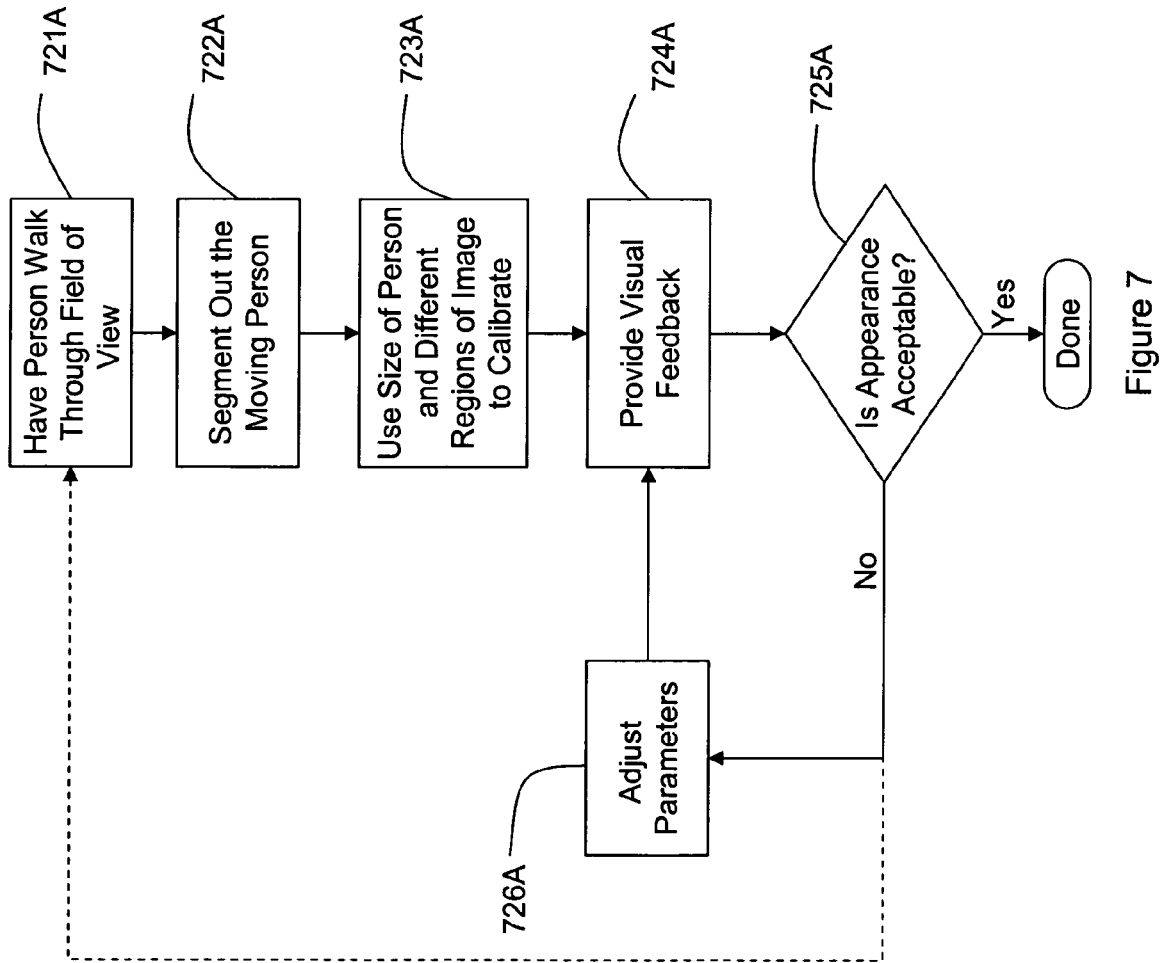
FIG. 7 shows a flowchart depicting a second embodiment of the calibration step shown in FIG. 5.

An embodiment of the aided segmentation calibration method, which uses implicit calibration and may also involve at least some degree of explicit calibration (see below), is shown in FIG. 7. In this embodiment, a person walks (or some other object of interest moves; the subsequent discussion will refer to a person but should be understood to be equally applicable to other types of objects of interest) through the field of view of sensing device 1 (Step 721A). This is to enable the system to determine the expected size of an average person in different areas of the image. The person walking should be the only moving object in the field of view during the calibration. The system then segments out the moving person 722A. The sizes of the person in different regions of the image are then used to calibrate (i.e., to determine the parameters as discussed above) 723A. Visual feedback is provided 724A, as in manual calibration, and the user then assesses whether or not the appearance of the image is acceptable 725A. If not, then the user may adjust the parameters 726A, or, alternatively, the calibration may be entirely redone, with the process looping up to Step 721A (dashed arrow). Which of these options is taken maybe made user selectable. If the appearance is acceptable, on the other hand, then the process is complete.

Figure 8:
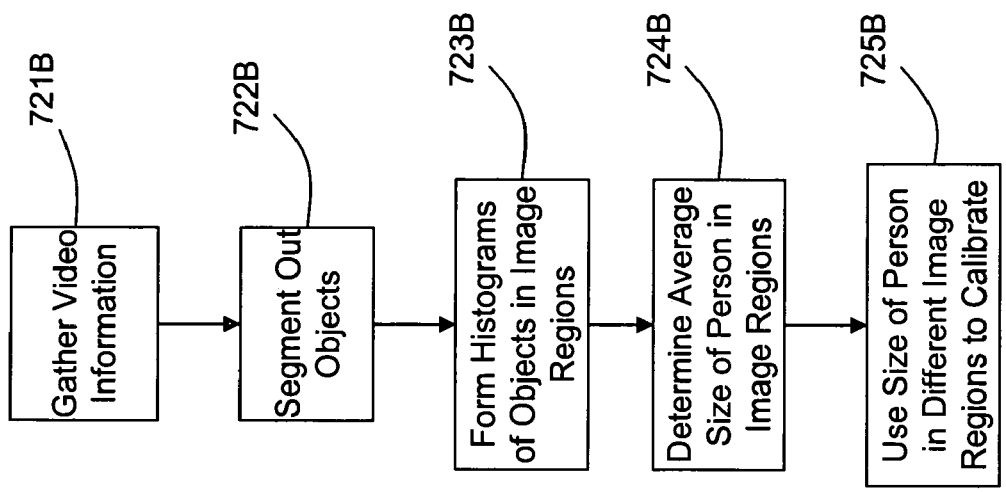
FIG. 8 shows a flowchart depicting a third embodiment of the calibration step shown in FIG. 5.

An embodiment of the fully automatic calibration method, which involves implicit calibration, is shown in FIG. 8. First, information (video information is shown in FIG. 8) is gathered by sensing device 1 over an extended period of time, say several hours to a few days 721B. After data has been gathered, objects are then segmented out for analysis 722B. Histograms are then generated for the various objects in various regions of the image 723B. Details of this step are further illustrated in FIG. 9.

Figure 9:
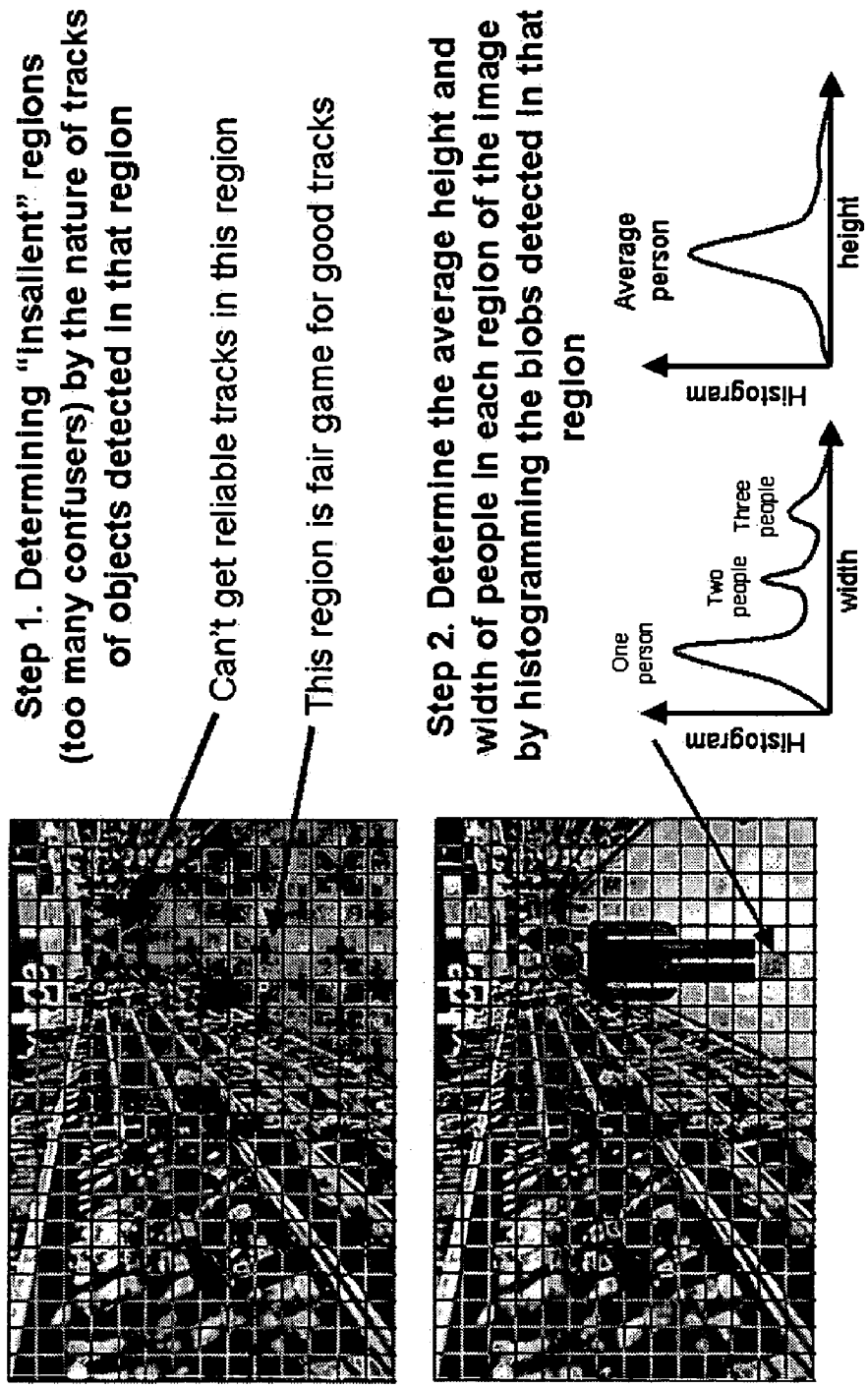
FIG. 9 illustrates an exemplary embodiment of the histogramming step shown in FIG. 8.

FIG. 9 shows histogramming step 723B embodied as a two-step process, although the invention is not limited to this process. In Step 1, the system determines "insalient" image regions, i.e., regions in which there are too many confusing objects to track objects reliably. As a result, only objects that can be tracked with high confidence are used; in one embodiment of the invention, these are the only objects that are stored. In Step 2, the system uses only the remaining image regions and forms histograms of objects detected in those regions. As indicated in Step 2, and as shown in FIG. 8, the system then uses the histograms to determine the average size of a person in each region of the image 724B. This information is then used to calibrate the system 725B. This latter process may be implemented similarly to step 723A of FIG. 7.

The step of determining the average size of a person in an image region 724B is carried out only if a sufficient number of objects to result in a meaningful determination are logged in a given region. The number of determinations needed for a meaningful histogram may be determined empirically and may depend, for example, on the amount and type of activity to which the tripwire will be exposed. For such regions, peaks are detected in the histograms. The highest peak in each image region, i.e., the most frequent occurrence, is assumed to be a single persons of this information is determined, then calibration is successfully carried out 725B, and the system is able to signal its readiness for actual operation.

The process of FIG. 8 is typically carried out without human intervention. However, it is possible for a user to provide time windows during which most objects are expected to be individual persons, to reduce the problem of trying to differentiate groups of people. Such time windows may be imposed either in the step of obtaining information 721B or in further processing steps.

Figure 10:
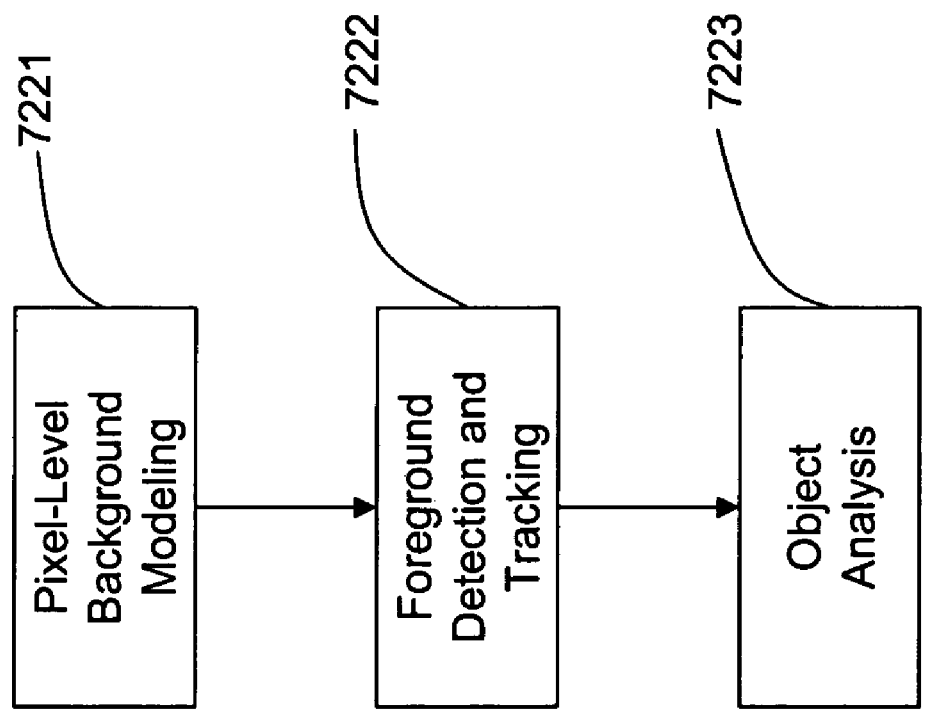
FIG. 10 shows a flowchart depicting an exemplary embodiment of the segmenting step shown in FIGS. 7 and 8.

Each of the automated calibration methods (aided and fully automatic) requires the segmentation of images into foreground objects and background (see steps 722A and 722B in FIGS. 7 and 8, respectively). An embodiment of this process is illustrated in FIG. 10. The exemplary embodiment consists of three steps: pixel-level background modeling 7221; foreground detection and tracking 7222; and object analysis 7223.

The objective of pixel-level background modeling 7221 is to maintain an accurate representation of the image background and to differentiate background (BG) pixels from foreground (FG) pixels. In an exemplary embodiment, this step implements the process disclosed in commonly-assigned U.S. patent application Ser. No. 09/815,385, entitled, "Video Segmentation Using Statistical Pixel Modeling," filed Mar. 23, 2001, and incorporated herein by reference in its entirety. The general idea of the exemplary method is that a history of all pixels is maintained over several frames, including pixel values and their statistics. A stable, unchanging pixel is treated as BG. If the statistics of a pixel change significantly, it will be considered to be FG. If the pixel stabilizes again, it will revert to being considered a BG pixel. This method serves to alleviate sensor noise and to automatically address changes to the background (for example, in a store, when a person removes an item from a shelf, the shelf will instantaneously be treated as FG but will revert to BG after the scene re-stabilizes).

The objective of foreground detection and tracking 7222 is to combine the FG pixels into FG objects and to track them over a number of frames, to guarantee spatio-temporal consistency. This obtains sets of pixels determined to be FG pixels, as well as their statistical properties, from the pixel-level background modeling 7221. In an exemplary embodiment, the FG pixels are spatially merged into larger FG objects using simple morphology and connected component detection, techniques that are well-known in the art. These objects are tracked using correlation methods over several frames to obtain reliable size information. Exemplary tracking techniques are discussed in, for example, commonly-assigned co-pending U.S. patent application Ser. No. 09/694,712, entitled, "Interactive Video Manipulation," filed Oct. 24, 2000, and incorporated herein by reference in its entirety. See, also, e.g., Wren, C. R. et al., "Pfinder: Real-Time Tracking of the Human Body," *IEEE Trans. on Pattern Matching and Machine Intelligence*, Vol. 19, pp. 780–784, 1997; Grimson, W. E. L. et al., "Using Adaptive Tracking to Classify and Monitor Activities in a Site," *CVPR*, pp. 22–29, June 1998; and Olson, T. J. and Brill, F. Z., "Moving Object Detection and Event Recognition Algorithm for Smart Cameras, *IUW*, pp. 159–175, May 1997. Each of these references is to be considered as being incorporated by reference herein in its entirety.

The third step, object analysis 7223, has a number of functions. Object analysis 7223 may serve to separate and count objects; to discriminate between objects of interest (e.g., people) and "confusers" (e.g., shopping carts); to determine an object's direction of motion; and to account for occlusions of objects. In an illustrative embodiment, determinations regarding an object are made based on one or more of: its size; its internal motion; the number of head-like protrusions (e.g., if people are the objects of interest); and face detection (for example, again, in the case in which people are the objects of interest). Techniques for performing such functions are known in the art, and examples of such techniques are discussed in, for example, Allmen, M., and Dyer, C., "Long-range Spatiotemporal Motion Understanding Using Spatiotemporal Flow Curves," *Proc. IEEE CVPR*, Lahaina, Maui, Hi., pp. 303–309, 1991; Gavrila, D. M., "The Visual Analysis of Human Movement: A Survey," *CVIU*, Vol. 73, No. 1, pp. 82–98, January 1999; Collins, Lipton, et al., "A System for Video Surveillance and Monitoring: VSAM Final Report," Robotics Institute, Carnegie-Mellon University, Tech. Rept. No. CMU-RI-TR-00-12, May 2000; Lipton, A. J., et al., "Moving Target Classification and Tracking from Real-Time Video," 1998 DARPA IUW, Nov. 20–23, 1998; and Haering, N., et al., "Visual Event Detection," Video Computing Series, M. Shah, Ed., 2001. Each of these references is to be considered as being incorporated by reference herein in its entirety.

Returning now to FIG. 5, the step of calibration 72 is followed by a step of initializing the system 73. This step permits a user to enter various parameters relating to how the system will gather, respond to, and report data. First, a user may superimpose one or more lines of interest on the image; these lines will serve as one or more tripwires. The lines may be of any orientation and may be placed almost anywhere in the image; the exception is that the lines may not occur too close to image boundaries because the object (e.g., person) crossing the line must be at least partially visible on both sides of the line for detection to occur. In an illustrative embodiment, it is assumed that the tripwire is on the ground in the image; that is, detection occurs when the bottom portion of an object (e.g., a person's legs) crosses the line. In a more general embodiment, the user may set a height above the ground for each line.

Other parameters that may be initialized include a time interval of active detection; a direction of crossing each line as a criterion for event detection (for example, to determine when a person enters an area, as opposed to when it is desired to determine when a person either enters or exits the area); and sensitivity of the detection.

Embodiments of this invention may include various different types of tripwires. For example, a video tripwire need not be straight; one or more curved tripwires may be drawn that follow the contour of one or more regions in a scene. In a similar vein, a video tripwire need not be a single linear segment; a video tripwire may comprise a multi-segment tripwire that is made up of more than one linear segment. Furthermore, a video tripwire need not merely comprise a single tripwire; on the contrary, a video tripwire may comprise "multiple" parallel tripwires that may, for example, require an object to cross all of the tripwires in a particular order or within a particular period of time. Other variations may be possible, as well, and the invention is not limited to these examples.

Embodiments of this invention may include a graphical user interface (GUI). In such embodiments, the user may initialize the system by literally drawing a tripwire on a video image, or an image that is a snapshot from a video stream (e.g., such a "snapshot" may be a frame of a video stream or may be separately acquired). This may be done using a "point and click" interface, wherein a user may select a point on an image using a pointing device, such as a mouse, and then drag a tripwire along the image, thus designating the tripwire. Other components of a tripwire rule, such as directionality (left-to-right, right-to-left, either), object type (human, vehicle, animal, etc.), object speed, etc., may also be selected using a "point-and-click" interface. For example, directionality may be selected as options on a graphical menu selected using, for example, a pointing device, such as a mouse; object type may be selected from a list or pull-down menu using, for example, a pointing device, such as a mouse; and so on.

Another function of initialization 73 is for the user to select various logging options. These options determine what data is collected and may include, but are not limited to:

logging only when people (or, in general, objects of interest) cross;
logging only when two or more people cross;
logging all crossings;
logging only when there is a high degree of confidence in the detection of a crossing;
logging only detection statistics;
taking a "snapshot" or creating a whole video around a detection event.

By a "snapshot," it is meant that a still image is created, which may simply be a particular video (or other sensing device) frame, or which may be independently generated.

These various options, in combination, may be considered a video event rule. A video event rule may comprise a prescribed action (such as a "human" crossing a "virtual tripwire" in a prescribed direction) and a prescribed response (such as logging the alert with text and video to a database and sending an e-mail to a particular email address). Video event rules may encompass more complex activities involving other virtual video features, such as areas of interest, along with other classes of activities, such as loitering, leaving a bag behind, or stealing an item, and other types of response, such as activating a Digital Video Recorder (DVR) or sounding an audible alarm.

After initialization 73, the system operates to collect and analyze data 74. If the user has entered a time window, the system starts processing when it is within this time window. When it detects a tripwire event (of a particular type, if specified by the user), it is logged along with accompanying information; types of accompanying information will become apparent below in the discussion of data reporting. In the context of some applications, a tripwire event may trigger an alarm or other response 76 (e.g., taking a snapshot).

Figure 11:
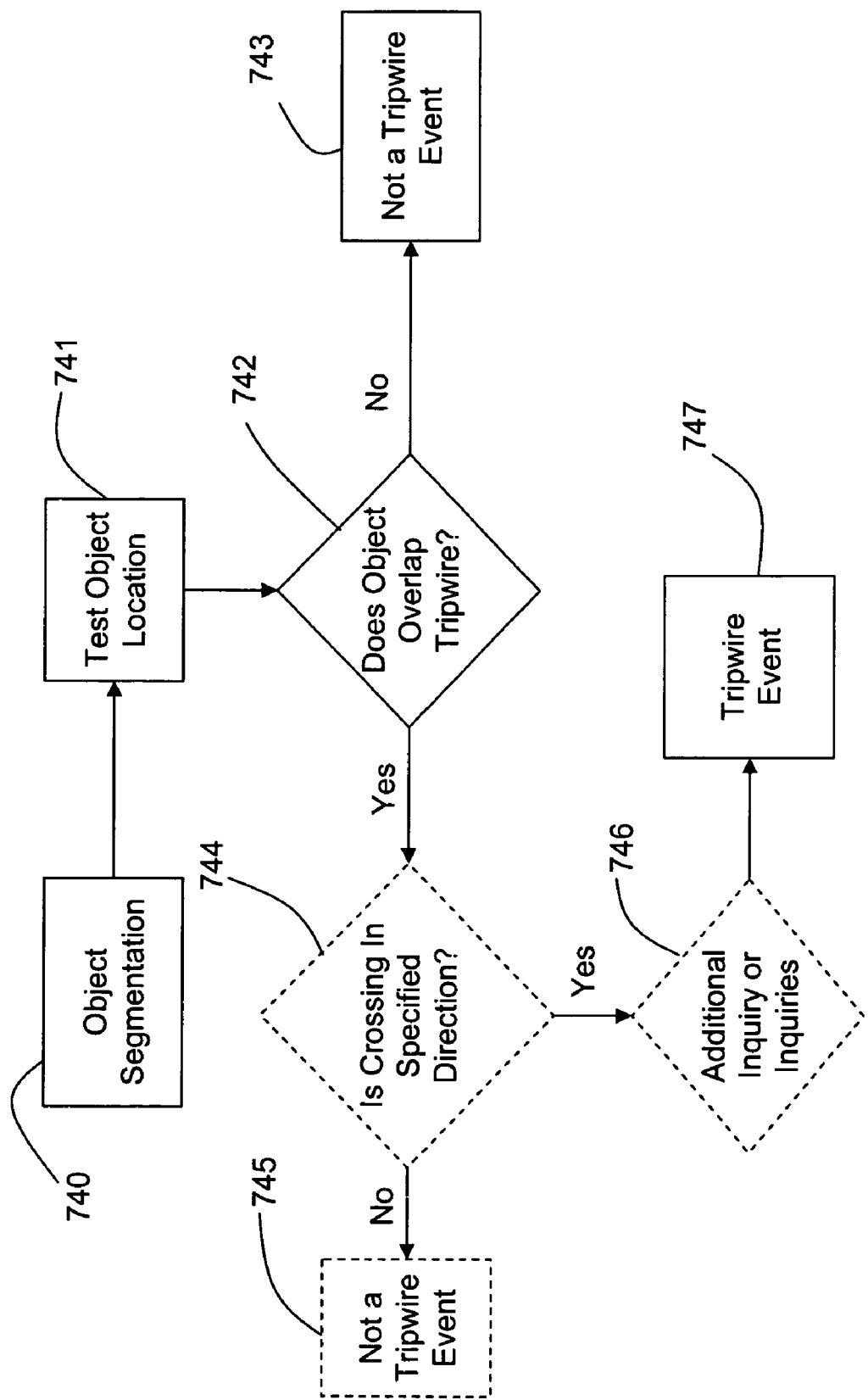
FIG. 11 shows a flowchart depicting an exemplary embodiment of a step of detecting, a tripwire crossing.

An embodiment of an exemplary technique for performing analysis and detecting tripwire events is shown in FIG. 11. FG objects are first determined from the video using object segmentation 740. Object segmentation 740 may, for example, comprise steps 7221, 7222 and 7223 shown in FIG. 10 and discussed above. The location of a FG object is then tested 741 to determine if it overlaps a line representing a tripwire 742 As discussed above, in an exemplary embodiment in which tripwire lines are always assumed to be on the ground, an object is determined to cross a tripwire if the bottom portion of the object overlaps a tripwire line. If it is determined that no overlap occurs, there is no tripwire event 743. If there is overlap, then, if only crossings in a specified direction are considered to be tripwire events, the direction of crossing is tested 744, and those crossings not occurring in the specified direction are not considered to be tripwire events 745. If crossings in either direction represent tripwire events, then the process skips the test of step 744. If step 744 has been performed and yields a positive result, or if step 744 is not performed, then additional inquiries 746 may also be performed. Such inquiries might, for example, include determining a particular characteristic of an object of concern (e.g., a car, a truck, a blue car, a blue station wagon, a car smaller than a certain size, etc.) or a particular object (e.g., a particular person's face, a license plate number, etc.). If such inquiries 746 return positive results, or if no such inquiries are made, then the process determines that a tripwire event has occurred 747. Of course, should such inquiries 746 be made and return negative results, then it would be determined that no tripwire event has occurred.

Several methods for implementing the determination of direction of a crossing 744 are possible. As a first example, it may be implemented through the use of optical flow methods to objects detected as crossing the tripwire; the use of optical flow methods could also serve to obviate the need for object segmentation. As a second example, trajectory information may be used from object tracking (in step 7222 of FIG. 10). As a third example, it may be implemented by setting up secondary (dummy) tripwires on either side of each actual tripwire entered by the user and determining in what order the secondary tripwires are crossed when the actual tripwire is crossed.

Calibration 72 is of particular importance in the execution of step 74, particularly if only a particular type of object is of interest. For example, if people are the objects of interest, calibration 72 permits step 74 to discriminate between, for example, people and objects that are either smaller (e.g., cats and mice) or larger (e.g., groups of people and cars) than people.

When data has been gathered, it can then be reported to a user 75. In an exemplary embodiment of the invention, a user can query the system for results using a graphical user interface (GUI). In this embodiment, summary information and/or detailed data on one or more individual detections may be displayed. Summary information may include one or more of the following: number of detections, number of people (or other objects of interest) detected, number of multi-person (multi-object) detections (i.e., when multiple persons (or other objects of interest) cross simultaneously), number of people (objects) crossing in each direction, any or all of the preceding within a user-selected time window, and one or more time histograms of any or all of the preceding. Details on a single detection may include one or more of the following: time, direction, number of people (objects) crossing, size of object(s) crossing, and one or more snapshots or videos taken around the time of the detection.

Figure 12:
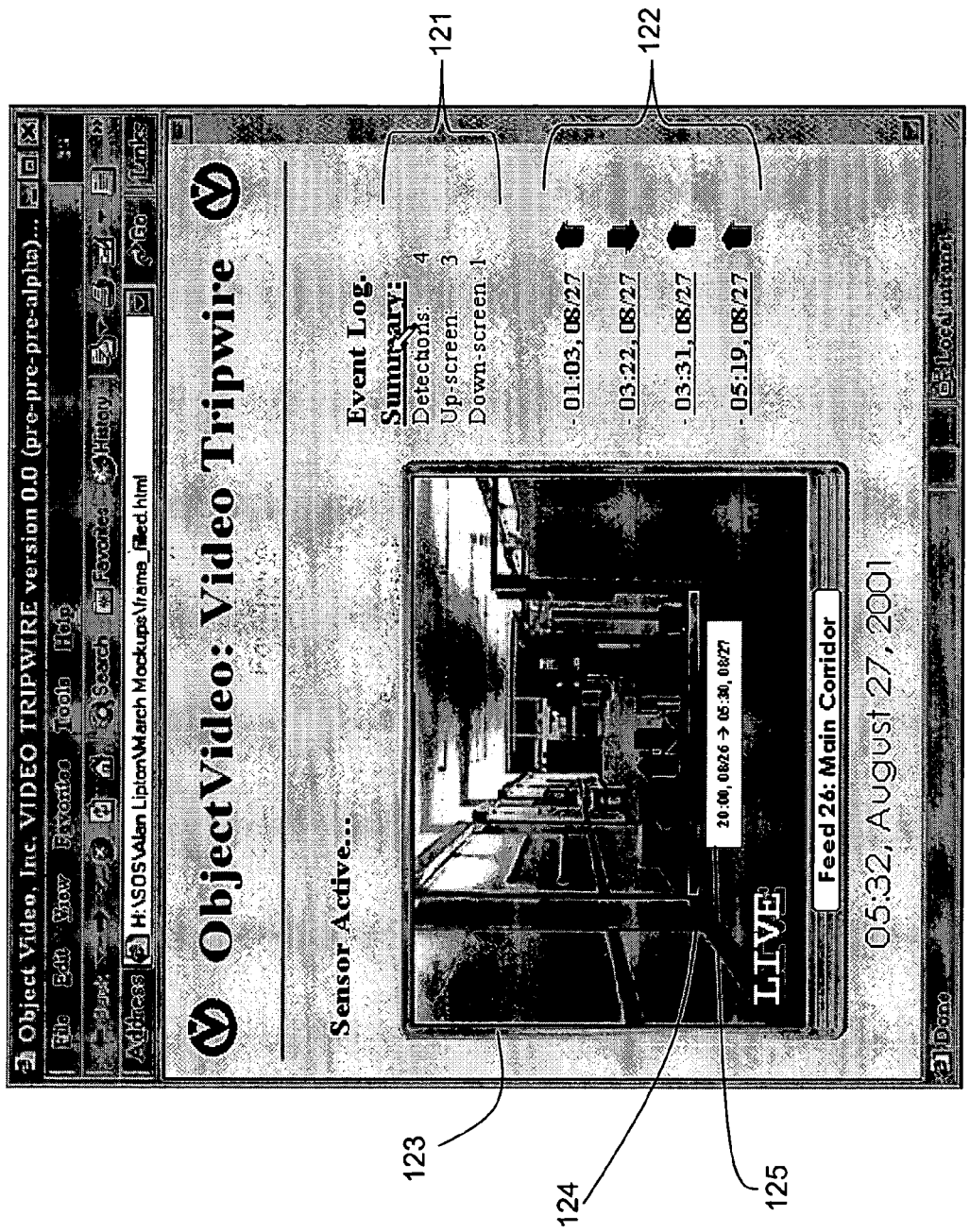
FIGS. 12 and 13 show "screen shots" depicting exemplary embodiments of reporting formats.
Figure 13:
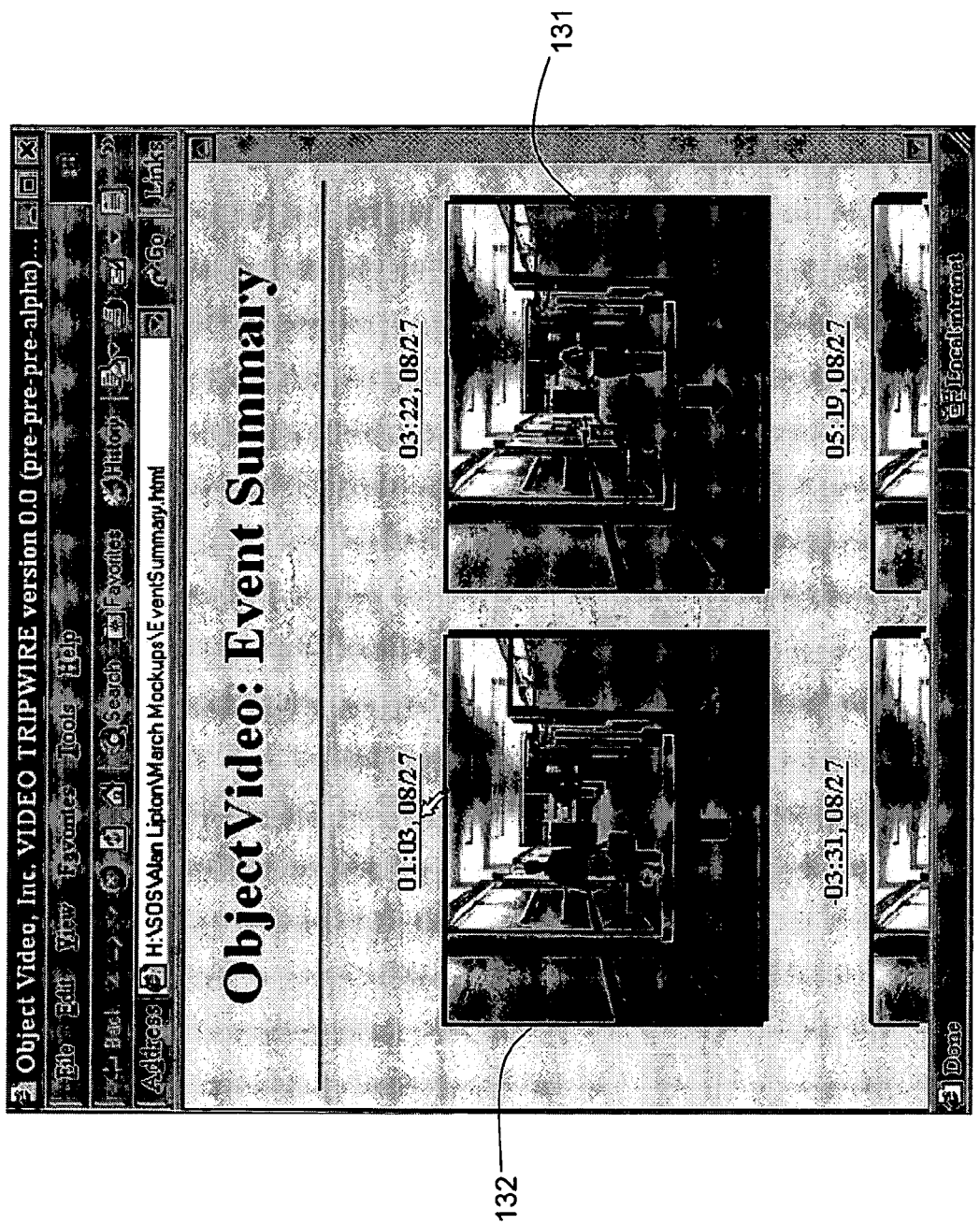

FIGS. 12 and 13 show sample screen shots of illustrative reporting displays, in an exemplary embodiment. FIG. 12 shows summary information 121 about crossings of a tripwire 124 spanning a corridor. In this particular illustration, the screen shows live video 123 of the area including tripwire 124. Also included is a caption 125 giving the period during which surveillance has been occurring (i.e., a time window) and during which crossing events have been logged. Summary information 121 includes numbers of crossings and their directions. In this case, the user has further specified that the specific crossing times and dates should be displayed 122.

FIG. 13 shows individual information about particular crossing events; these crossing events happen to correspond to the specific crossing times and dates 122 in FIG. 12. In the display of FIG. 13, the user has chosen to display a snapshot of each crossing event, along with its time and date. In particular, the snapshots 131 and 132 correspond to crossing events in the area shown in video 123 of FIG. 12. In a further embodiment, the user may be able to click on a snapshot or a button associated with a snapshot to view a corresponding video taken around the time of the crossing event.

Figure 14:
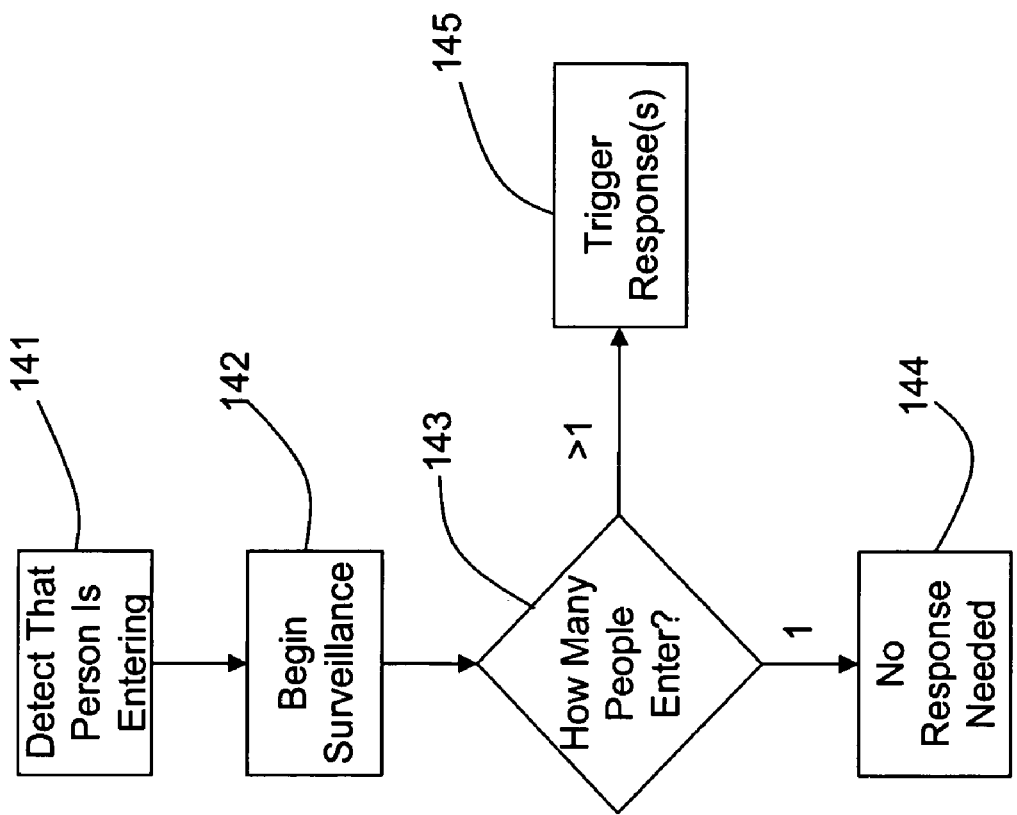
FIG. 14 shows a flowchart depicting an exemplary application of the invention.

An example of an application of the inventive video tripwire is the detection of "tailgating." Tailgating describes an event in which a certain number of people (often one person) is permitted to enter an area (or the like) and one or more others try to follow closely to also gain entry. FIG. 14 depicts a flowchart of a method for implementing a tailgating detection system. In this embodiment, it is assumed that a video surveillance camera is installed in such a position as to be able to record entries through an entrance, for example, a door or a turnstile. Furthermore, the camera has to be calibrated as discussed above. The system begins by detecting that a person is entering, or is about to enter, through the entrance 141. This may be accomplished by any number of means; for example, one may have to enter money, enter a code on a keypad, or swipe a card through a card reader, or the system may use a video-based detection method to visually detect the opening of the entrance (this would have the advantage of not requiring an interface with external equipment (card reader, keypad, or the like), which may make for easier installation and implementation in some environments). When an entry is detected, surveillance begins 142. During this surveillance, the system detects objects moving through the entrance and analyzes them to determine how many people have entered. This may involve face detection, as mentioned above, if the camera is situated so as to be able to record faces. The system then determines whether the number of people who entered is permissible 143. In the illustrated embodiment, only one person is permitted to enter at a time; however, in more general embodiments this could be any selected number. If one person (the permissible number) enters, then no response is necessary 144. On the other hand, should more than one person (more than the permissible number) enter, a response is triggered 145. Such a response may include, for example, sounding an alarm, taking a snapshot, or recording video surrounding the entry. An added advantage of a system using either of the latter two responses is that it may provide useful evidence in tracking down a person using a stolen card, in the case of a system with a card reader.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed is:

1. A video tripwire system comprising:
   a sensing device producing video output; and
   a computer system, including a user interface, for performing calibration and for gathering and processing data based on video output received from the sensing device, the user interface comprising input means and output means, said input means including a graphical user interface, wherein the computer system displays processed data, and wherein said graphical user interface is adapted to enable a user to draw a video tripwire on at least one of a video image of said video output or a snapshot taken from said video output.

2. The video tripwire system according to claim 1, wherein said graphical user interface comprises a point-and-click interface.

3. The video tripwire system according to claim 2, wherein the point-and-click interface comprises at least one menu.

4. The video tripwire system according to claim 1, wherein said graphical user interface is further adapted to enable a user to enter at least one tripwire rule.

5. The video tripwire system according to claim 4, wherein said at least one tripwire rule includes at least one of directionality, object type, and object speed.

6. The video tripwire system according to claim 4, wherein said graphical user interface includes at least one menu adapted to enable a user to enter said at least one tripwire rule.

7. A video tripwire user interface comprising:
   a graphical user interface adapted to enable a user to draw a video tripwire on at least one of a video image and a snapshot from a video stream.

8. The user interface according to claim 7, wherein the graphical user interface comprises a point-and-click interface.

9. The user interface according to claim 7, wherein the graphical user interface comprises at least one menu.

10. The user interface according to claim 7, wherein the graphical user interface is further adapted to enable a user to enter at least one tripwire rule.

11. The user interface according to claim 7, wherein the graphical user interface is further adapted to enable a user to enter at least one video event rule.

12. A method of initializing a video tripwire system, comprising:
    entering parameters; and
    drawing a video tripwire on at least one of a video image and a snapshot from a video stream.

13. The method according to claim 12, wherein said drawing a video tripwire comprises:
    using a graphical user interface.

14. The method according to claim 13, wherein the graphical user interface comprises a point-and-click interface.

15. The method according to claim 12, further comprising:
    entering at least one tripwire rule.

16. The method according to claim 15, wherein the tripwire rule includes at least one of directionality, object type, and object speed.

17. The method according to claim 15, wherein said entering comprises:
    using a point-and-click interface.

18. The method according to claim 17, wherein the point-and-click interface comprises at least one menu.

19. The method according to claim 12, further comprising:
    entering at least one video event rule.

20. A computer-readable medium containing instructions that, when executed by a computer, cause the computer to be adapted to enable a user to perform the method of claim 12.

21. The computer-readable medium according to claim 20, further containing instructions that, when executed by a computer, cause the computer to create a graphical user interface adapted to enable a user to perform said drawing.

22. The computer-readable medium according to claim 21, wherein the graphical user interface comprises a point-and-click interface.

23. The computer-readable medium according to claim 22, wherein the point-and-click interface includes at least one menu.

24. A video tripwire system comprising:
    a computer system; and
    the computer-readable medium according to claim 20.

25. A video tripwire system comprising:
    a sensing device producing video output; and
    a computer system, including a user interface, for performing calibration and for gathering and processing data based on video output received from the sensing device, the user interface comprising input means and output means, wherein the computer system displays processed data, and wherein the computer system includes software permitting a user to enter at least one virtual tripwire, the video tripwire comprising at least one of a curved video tripwire, a multi-segment video tripwire, and a multiple parallel video tripwire.

26. A method of implementing a video tripwire system comprising:
    calibrating a sensing device to determine sensing device parameters for use by the system;
    initializing the system, including entering at least one virtual tripwire, said at least one virtual tripwire comprising at least one of a curved tripwire, a multi-segment tripwire, and a multiple parallel tripwire;
    obtaining data from the sensing device;
    analyzing the data obtained from the sensing device to determine if the at least one virtual tripwire has been crossed; and
    triggering a response to a virtual tripwire crossing.

27. A video tripwire system comprising:
    a sensing device providing output data; and
    a computer system receiving the output data and comprising:
    a user interface;
    at least one processor; and
    a computer-readable medium containing software implementing the method of claim 26.

28. A video tripwire apparatus comprising:
    an apparatus adapted to be coupled to a sensing device, said sensing device to produce video output, said apparatus including a user interface, said apparatus adapted to perform calibration and to gather and process data based on video output received from the sensing device, the user interface comprising a graphical user interface, wherein said apparatus is adapted to display processed data, and wherein said graphical user interface is adapted to enable a user to draw a video tripwire on at least one of a video image of said video output or a snapshot taken from said video output.

29. The apparatus of claim 28, wherein said apparatus comprises application-specific hardware to emulate a computer and/or software, said hardware adapted to enable said video tripwire.

* * * * *